US 12,248,828 B1

(12) United States Patent
Morales

(10) Patent No.: US 12,248,828 B1
(45) Date of Patent: Mar. 11, 2025

(54) PRINTING SYSTEM AND METHODS FOR ENHANCED PAPER SELECTION

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/494,013

(22) Filed: Oct. 25, 2023

(51) Int. Cl.
*H04N 1/60* (2006.01)
*G06K 15/00* (2006.01)

(52) U.S. Cl.
CPC ....... *G06K 15/4065* (2013.01); *G06K 15/002* (2013.01)

(58) Field of Classification Search
CPC ............. G06K 15/4065; G06K 15/002; H04N 1/00482; H04N 1/33315; H04N 1/2323
See application file for complete search history.

(56) References Cited

U.S. PATENT DOCUMENTS

| | | | |
|---|---|---|---|
| 2002/0005433 A1 | 1/2002 | Nochi et al. | |
| 2005/0031392 A1* | 2/2005 | Yamamoto | G06K 15/02 400/62 |
| 2009/0225181 A1* | 9/2009 | Lee | H04N 1/00347 348/222.1 |
| 2011/0080614 A1* | 4/2011 | Sasaki | G06K 15/005 358/1.18 |
| 2015/0002862 A1* | 1/2015 | Maeda | B41J 11/0095 358/1.2 |
| 2015/0242162 A1* | 8/2015 | Albers | G06F 3/1288 358/1.15 |
| 2017/0171432 A1* | 6/2017 | Qiao | H04N 1/6008 |
| 2019/0114519 A1* | 4/2019 | Kimura | B41J 11/485 |
| 2020/0120223 A1* | 4/2020 | Tong | H04N 1/3873 |
| 2022/0155715 A1* | 5/2022 | Takehana | G03G 15/6508 |

* cited by examiner

*Primary Examiner* — Iriana Cruz
(74) *Attorney, Agent, or Firm* — Millen, White, Zelano & Branigan P.C.; William F. Nixon

(57) ABSTRACT

A printing system receives a print job. The print job includes parameters such as dimensions and print attributes. A plurality of papers is accessed in a paper catalog available for a printing device within the printing system. A group of papers is formed based on the dimensions. If the dimensions are for a non-standard size paper, then a standard size of available paper is determined. The smallest standard size paper that fits the dimensions of the print job may be a determined size. The group of papers includes paper entries from the paper catalog having the standard size. Subsets of the group of papers is defined using the attributes. The groups and subsets are presented in a recommended list of paper entries from the paper catalog.

9 Claims, 7 Drawing Sheets

PRINTING SYSTEM AND METHODS FOR ENHANCED PAPER SELECTION

FIELD OF THE INVENTION

The present invention relates to a printing device or system for selecting paper for printing operations using methods for enhanced paper selection.

DESCRIPTION OF THE RELATED ART

Aside from the number of copies, paper selection is an important print setting for jobs in a production print environment. Production printing devices manage papers using a paper catalog in the digital front end (DFE) of the printing device. The paper catalog may have hundreds of papers stored within. Operators must select the required paper from a long list of papers in the paper catalog. This process may be inefficient as it is left up to the operator to sort through a large list of papers that, in most cases, is composed largely of papers that are not appropriate for the current job. The process also may be impacted when the job calls for non-standard paper.

SUMMARY OF THE INVENTION

A method for selecting a paper media for printing operations is disclosed. The method includes receiving a print job for a printing device. A sheet of the print job includes dimensions. The method also includes accessing a plurality of papers in a paper catalog available for the printing device. The method also includes determining that a paper within the plurality of papers is not available applicable to the print job based on the dimensions of the sheet. The method also includes determining at least one paper having a smallest standard size within the plurality of papers to fit the dimensions of the sheet. The method also includes forming a first group of the at least one paper corresponding to the smallest standard size. The method also includes displaying the first group having the at least one paper having the smallest standard size as available to print the print job.

The method for selecting the paper media for printing operations further includes determining at least one paper having a largest standard size within the plurality of papers that do not fit the dimensions of the sheet. The method further includes forming a second group of the at least one paper corresponding to the largest standard size. The method further includes displaying the second group having the at least one paper having the largest standard size as available to print the print job.

A method for managing printing operations for papers printable at a printing device is disclosed. The method includes receiving a print job for the printing device. The print job includes a print ticket having a parameter. The method also includes determining dimensions of a sheet of the print job. The method also includes accessing a plurality of papers available to print at the printing device. The method also includes determining a first group of papers from the plurality of papers based on the dimensions of the sheet. The first group of papers includes at least one paper. The method also includes refining the first group of papers using the parameter of the print ticket for the print job. The method also includes displaying the refined first group having the at least one paper within a user interface accessible to the printing device. The parameter and the dimensions are indicated within the user interface.

A printing system having a plurality of papers available to print at a printing device. The printing system includes a processor. The printing system also includes a memory connected to the processor. The memory storing instructions that, when executed on the processor, configures the printing system to receive a print job for the printing device. The print job includes a print ticket having a parameter. The printing system also is configured to determine dimensions of a sheet of the print job. The printing system also is configured to access a plurality of papers available to print at the printing device. The printing system also is configured to determine a first group of papers from the plurality of papers based on the dimensions of the sheet. The first group of papers includes at least one paper. The printing system also is configured to refine the first group of papers using the parameter of the print ticket for the print job. The printing system also is configured to display the refined first group having the at least one paper within a user interface accessible to the printing device. The parameter and the dimensions are indicated within the user interface.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
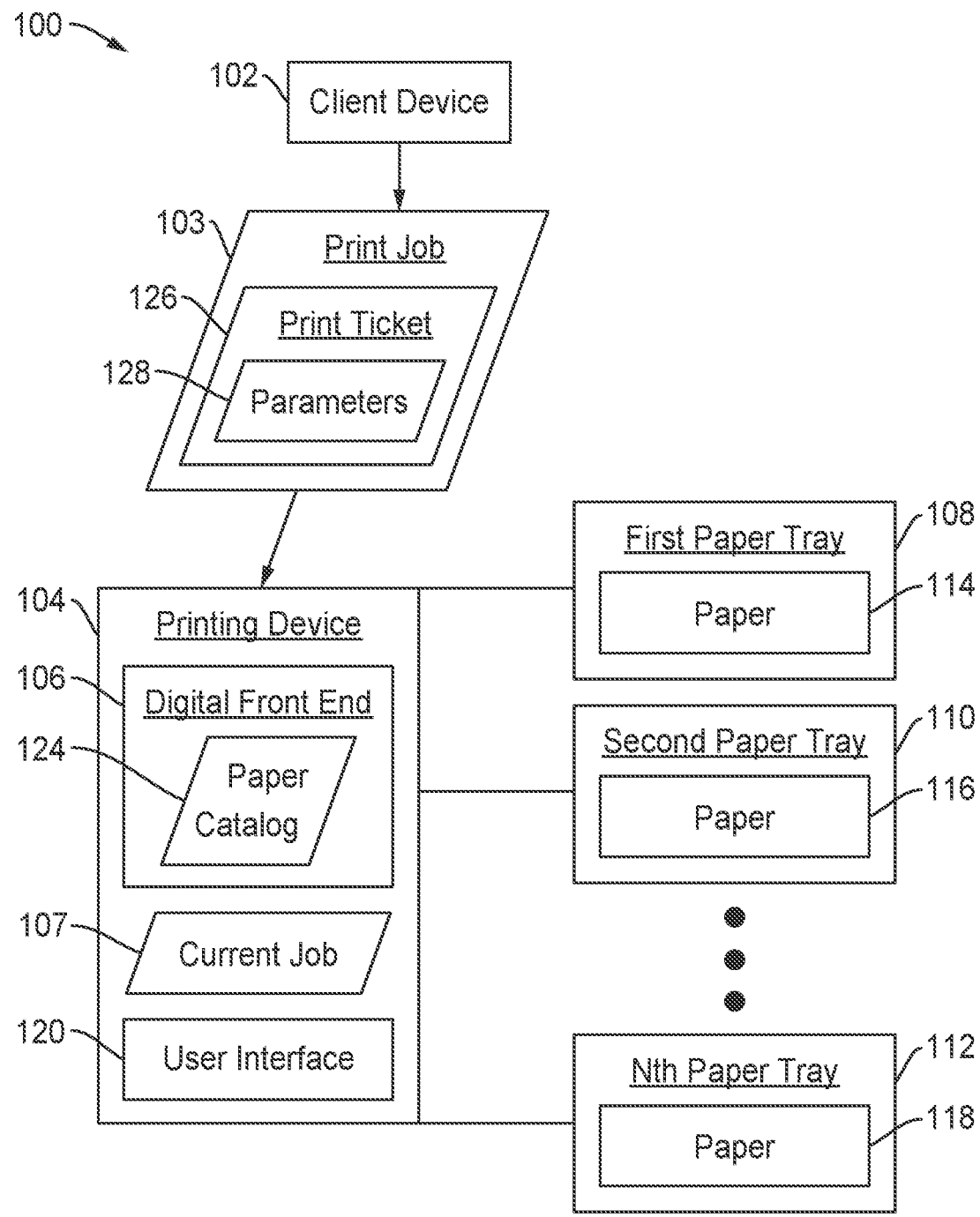
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enhance how a paper is selected from paper catalogs in a production printing device. Instead of showing a single list of papers, either in a menu or within a dialog, the paper selection would show a multi-tab menu that separates papers into multiple and, in some cases, more targeted lists. The following lists may appear as tabs in the menu. The entire paper catalog may be listed in one of the tabs, as is commonly done. This feature would allow the operator to browse or search the entire paper catalog. Recent papers would be atop the list and favorite papers also may be atop the lists. A search function also may be provided. Papers assigned to a tray in the printing device may be in a separate list with favorite paper marked accordingly.

A list may be provided for recommended papers. The disclosed embodiments would create this list. This list would show the subset of papers that are "recommended" for the current job. The recommendations would be based on one or more factors. If the job does not have print instructions related to media, then the printing system may determine the dimensions of the job file and only show papers that match the job dimensions in this list. The list may be provided in a menu displayed by a user interface at the printing device or another device within the printing system.

If the job file dimensions are a non-standard size, then the disclosed embodiments will show the smallest paper size onto which the job will fit in the menu. If the smallest paper size is a standard paper size, then all papers will be that paper size. If the smallest paper size is a custom size then the disclosed embodiments will show that size and the smallest standard paper size that will fit the job. This feature may be enabled or disabled by the operator. Additionally, if the paper catalog has multiple custom paper sizes that are smaller than the standard paper size, then the disclosed embodiments may show these as well.

If the job specifies paper dimensions in the print instructions, then the menu will show papers that match those dimensions. If the job specifies other paper attributes but not dimensions, then the menu will subset the list of papers twice. First, the disclosed embodiments will find the papers using only PDL dimensions, and the options about how to handle non-standard paper sizes. Then the disclosed embodiments will further subset those to only the papers that match the specified media attributes. For example, if the job is letter size and the printing instructions specify blue, glossy paper then the printing system will only show letter, blue, glossy papers. If the job specifies paper dimensions and other attributes, then the list will show papers that match all specified attributes.

If the job specifies a paper tray from which to feed paper then the printing system will check the tray configuration to determine if the paper dimensions in the tray match the job file or the print instructions dimensions. If these do not match, then the disclosed embodiments may show a warning to the operator in the recommended paper list. The list of papers for the recommendation paper list does not change based on the specified tray. This warning lets the operator know that the tray cannot support the current dimensions.

Once the papers for the list are displayed, the disclosed embodiments will show these to the operator. The papers may be shown by name or via a combination of attributes. In addition, all paper attributes are shown in a tooltip so the operator can validate whether the paper is acceptable. Further, the disclosed embodiments will highlight the attributes that were used to add the paper to the recommended paper list. This functionality may allow the operator to understand why the specific papers are recommended for the specific jobs.

The disclosed embodiments also enable searching for all paper lists. The printing system will search all attributes for the specified search terms. The menu will filter based on the search results and the disclosed embodiments will highlight the attributes that were used to retain the paper in the filtered list. This highlight will be visually different versus the highlight used for the recommended paper list. The recommended paper list will show both selection and search highlights concurrently to ensure the operator understands exactly why a paper is in the list or in the search results. The disclosed embodiments enable operators to efficiently find the required paper for a given job even in cases in which a printing device has hundreds of papers and in cases in which dozens of papers may be acceptable for a given job.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000 s of pages or even 100,000 pages or more.

Print job 103 may include a print ticket 126 that sets forth one or more parameters 128 for the print job. For example, print tickets 126 may specify a size for a sheet of print job 103 as well as weight, quality of paper, color of paper, punched holes, and the like. The operator may generate print ticket 126 when submitting print job 103 for printing within printing system 100. Information from print ticket 126, such as one or more parameters 128, may be used to generate a list of recommended papers to display for print job 103.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 114, second paper tray 110 having paper 116, and so on to Nth paper tray 112 having paper 118. Current job 107 may use paper from one or more of these paper trays. In some embodiments, paper 114, paper 116, and paper 118 are different types of paper or different media. For example, current job 107 may use paper 116 from second paper tray 110 while print job 103 may require paper 114 from first paper tray 108.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 120 may be displayed on client device 102. The disclosed embodiments may use user interface 120 to select papers for print job 103.

DFE 106 also includes paper catalog 124. Paper catalog 124 is configured to organize and store existing calibration data and ICC profiles for a paper. Upon selection of a paper for printing at printing device, paper catalog 124 may be accessed to complete print job 103 according to the expectations associated with the print job. Paper catalog 124 is disclosed in greater detail below by FIG. 3. In some embodiments, DFE 106 may include multiple paper catalogs. Further, paper catalog 124 also may be stored in another component within printing system 100 and accessible by DFE 106.

Figure 1B:
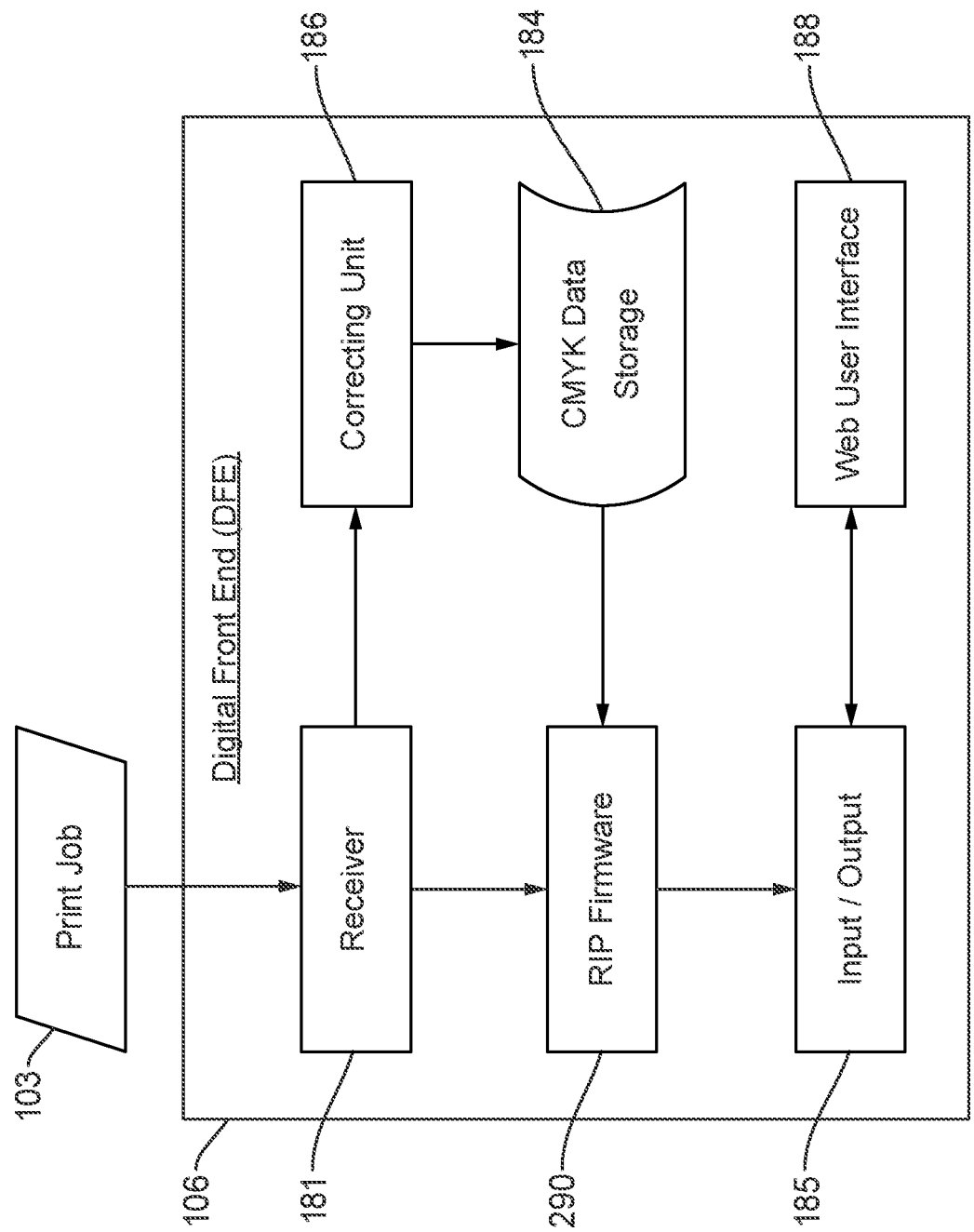
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed below.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
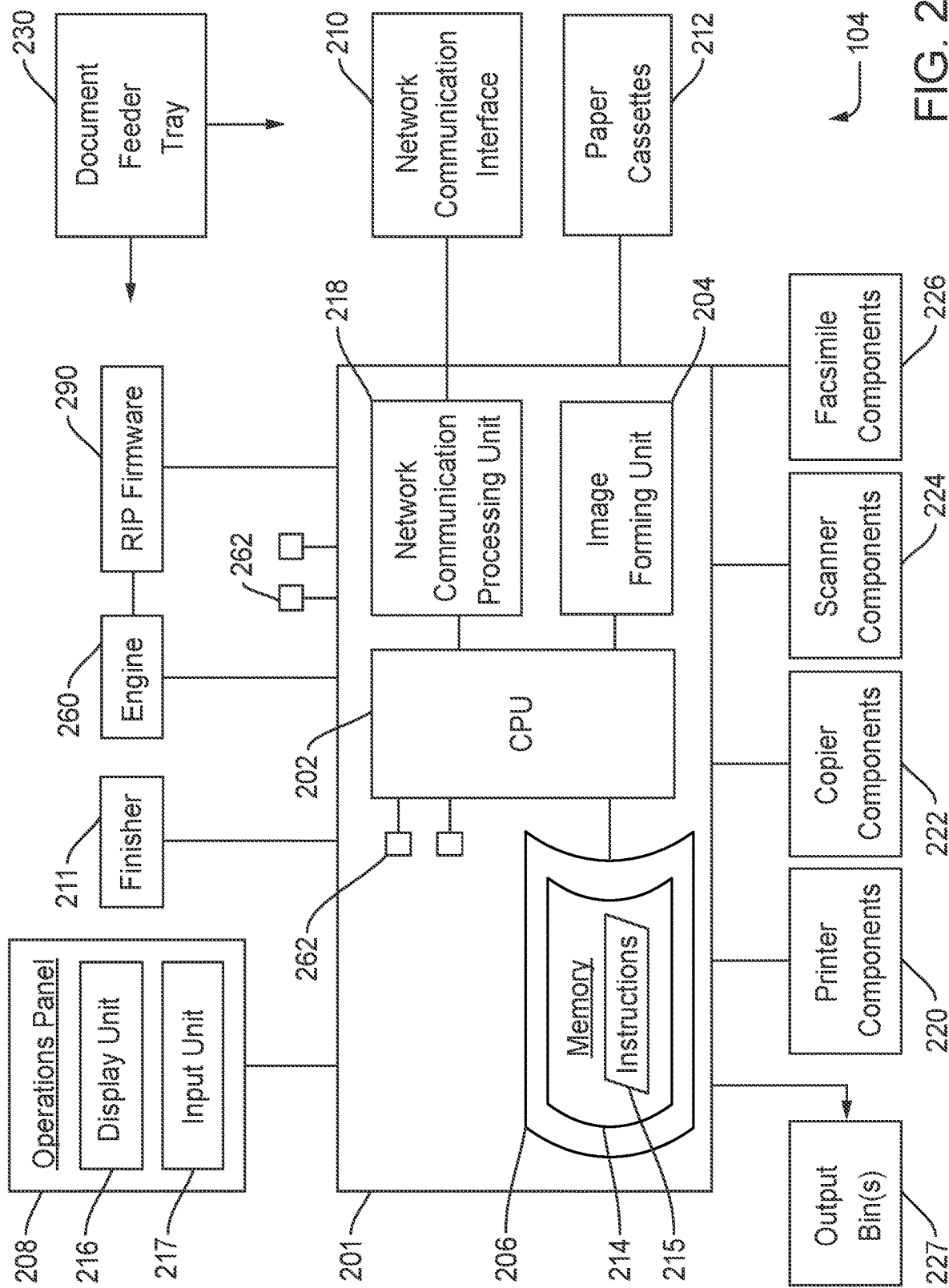
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108, 110, and 112 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
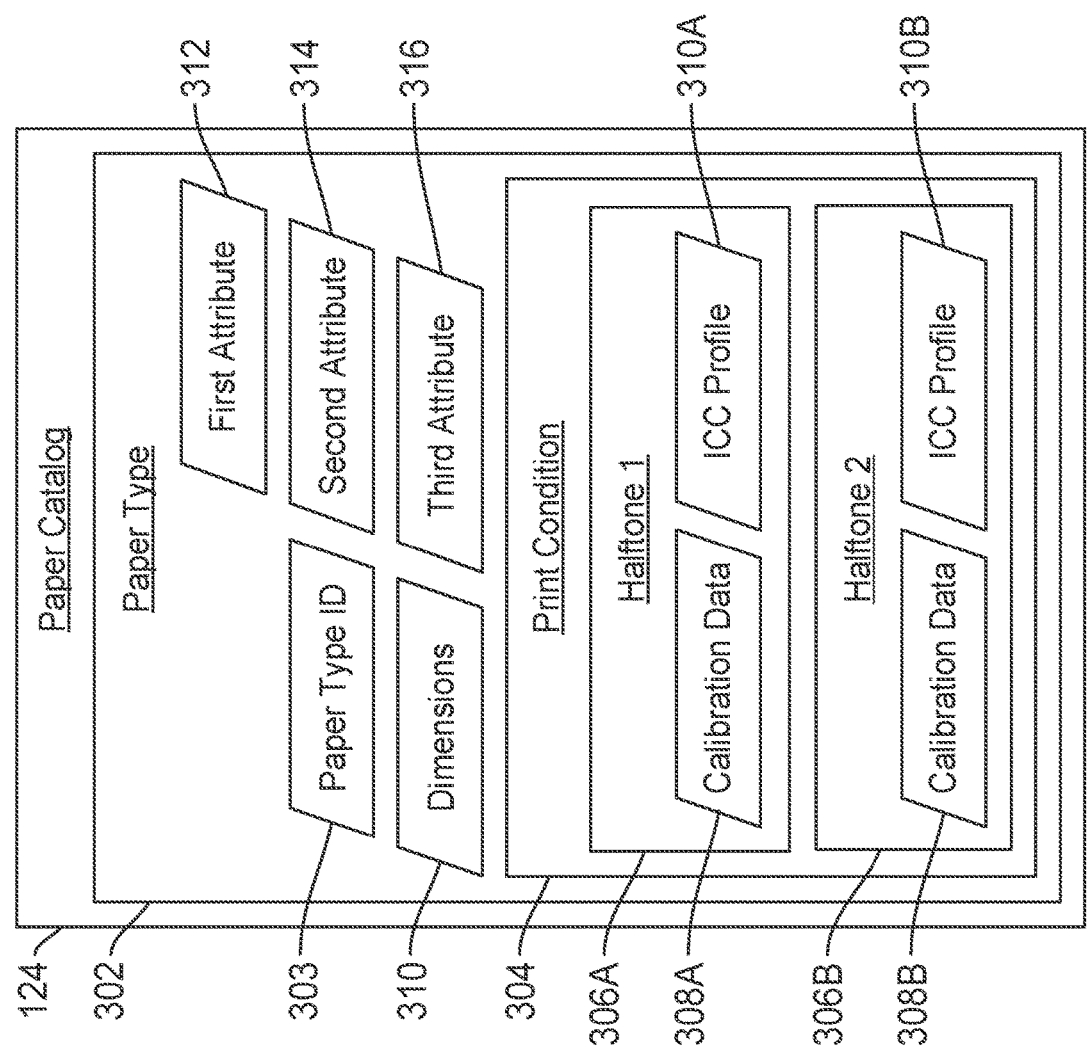
FIG. 3 illustrates a block diagram of a paper catalog for use within the printing system according to the disclosed embodiments.

FIG. 3 depicts a block diagram of paper catalog 124 for use within printing system 100 according to the disclosed embodiments. As disclosed above, paper catalog 124 may reside within DFE 106 of printing device 104. In other embodiments, paper catalog 124 may reside in another component within printing system 100, such as client device 102 or an external server. For brevity, paper catalog 124 is disclosed below as residing within DFE 106.

For each paper type used for a particular model of printing device 104, there are a set of items that work together to achieve optimal reproduction capabilities. These items may be represented in paper catalog 124. An example of an entry in paper catalog for a paper type 302 may be shown. Paper catalog may include hundreds or thousands of such entries. Paper type 302 may be identified within paper catalog 124 by paper type identification 303. In some embodiments, paper type identification 303 may be a unique symbol or code that identifies paper type 302 within paper groups, disclosed in greater detail below.

Paper type 302 includes print conditions. Print conditions may be applied to print jobs using paper type 302. Examples of print conditions may be high quality, default, ink saving, and the like. Each print condition may include its own color printing resources, such as calibration data and ICC profiles. Application of a print condition results in a different result for a print job using paper type 302 at printing device 104. For example, a high quality print condition will differ in some fashion as a finished, printed document from one printed using the default print condition.

As shown in FIG. 3, paper type 302 may include print condition 304. It also may include additional print conditions. Print condition 304 may relate to the high quality print condition for printing paper type 302 at printing device 104. Within print condition, halftones, or halftone designs, may be defined. Printing device 104 may have one or more halftones. Halftones are binary on/off dot patterns of each ink to mimic continuously varying transitions. One halftone could emphasize details in the image, while another could be best for smooth transitions. Thus, print condition 304 includes halftone 306A and halftone 306B. For example, halftone 306A may correspond to the halftone design to emphasize details in the image being printed. Halftone 306B may correspond to the halftone design to provide for smooth transitions.

For each halftone, the print shop should capture the desired per-colorant behavior over all shades of that colorant. By behavior, the disclosed embodiments refer to the color measurement. The record of these colorant behaviors, and the information that allows printing device 104 to be adjusted back to such behaviors, are stored as calibration data. These adjustments may vary linearly or with a curve. The calibration data include characteristics of each ink under the halftone selected. Thus, halftone 306A includes calibration data 308A and halftone 306B includes calibration data 308B.

Further, with a selected halftone, and the calibration data enforced to produce desired behavior of each colorant, the disclosed embodiments then create an ICC profile to fully characterize how ink combinations relate to standardized color measurements, as disclosed above. It is via the ICC profile that, for the specific paper-halftone-calibration-data set up, printing device 104 can reproduce the colors, text, and parameters of the original document. The process for generating an ICC profile is disclosed above. Thus, halftone 306A includes ICC profile 310A and halftone 306B includes ICC profile 310B.

Often printing systems have additional "dials" for more customized controls. For instance, there are settings of total ink amounts allowed in the ICC profile for preserving the glossy finish of a paper. Alternatively, it could be a very conservative expectation of the black ink response set into the calibration data. These more specific customizations may be identified as print conditions. In the scheme of the aforementioned items affecting color management, the disclosed embodiments place print conditions at the highest tier under each paper type, as shown in FIG. 3 by print condition 304.

Paper type 302 along with print condition 304 and halftones 306A and 306B may refer to the print management resources and items for one paper type. In a print shop, for each model of printing device 104, there may be dozens or more paper types in use. To keep track of the print management items for all these papers, paper catalog 124 may be implemented in system 100. As disclosed above, paper catalog 124 may be a software data storage system that archives all the color management items and resources for each paper type in use. When a print job is specified on a particular paper, identified as paper type identification 303, under a chosen print condition 302 employing halftone 306A, paper catalog 124 will provide the proper corresponding calibration data 308A and ICC profile 310A for printing device 104 to use. If the print job specifies print condition 302 employing halftone 306B, then paper catalog 124 will provide calibration data 308B and ICC profile 310B for printing device 104 to use for the print job.

The entry for paper type 302 also may include dimensions 310, such as length and width of a sheet of the paper type. Dimensions 310 may be a standard size of paper or a non-standard size. Paper type 302 also may include one or more attributes for the paper. For example, first attribute 312 may be the weight of a sheet of paper type 302. First attribute 312 may be 120 grams per square meter (gsm). Heavier paper is reflected by a higher number for gsm. Generally, heavier paper is associated with a higher quality of stock. It should be noted that dimensions 310 may also be considered an attribute of paper type 302. Further, first attribute 312 may be considered a dimension of paper type 302.

Paper type 302 also may include second attribute 314 and third attribute 316. These attributes may pertain some other feature of the paper of paper type 302 aside from dimensions and weight. Second attribute 314 may refer to the color of the paper for paper type 302, such as white, blue, yellow, and the like. Third attribute 316 may refer to a feature of the paper of paper type 302, such as recycled, new, and the like. Other potential attributes may be glossy or matte paper.

Dimensions and attributes within paper catalog 124 may not necessarily match the attributes for paper trays 108, 110, and 112. Paper trays 108, 110, and 112 also may have attributes that apply to print job 103 as specified by print ticket 126. Dimensions 310 may be included in print ticket 126. Dimensions 310 also may apply to a parameter within paper catalog 124 and paper trays 108, 110, and 112. The other attributes, however, within paper catalog 124 may not apply to any attribute for paper trays 108, 110, and 112.

Figure 4:
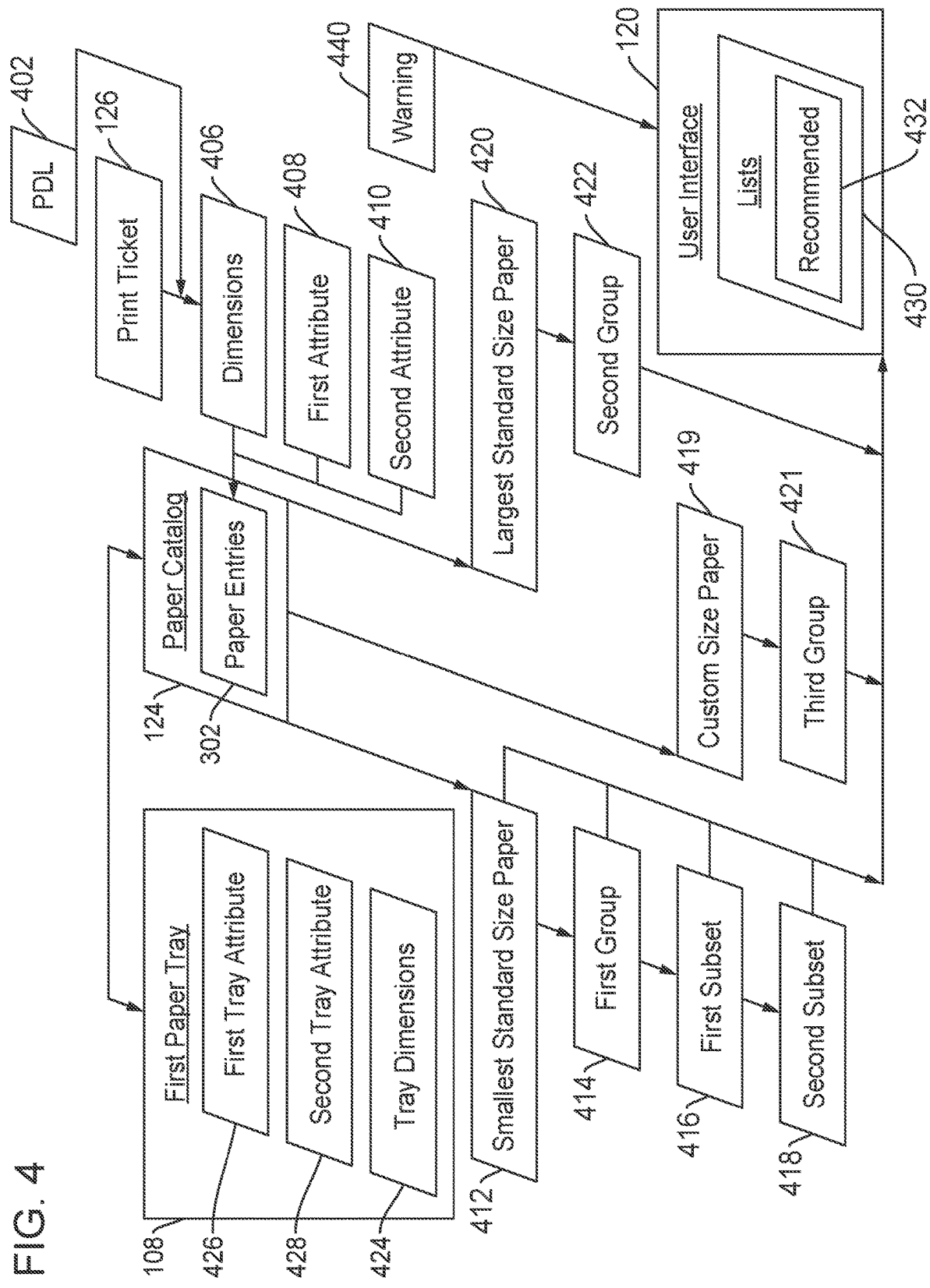
FIG. 4 illustrates a block diagram of using paper entries of a paper catalog to generate a recommended list to display within a user interface according to the disclosed embodiments.

FIG. 4 depicts a block diagram of using paper entries 404 of paper catalog 124 to generate a recommended list 432 to display within user interface 120 according to the disclosed embodiments. The elements disclosed by FIG. 4 may include components within DFE 106, such as paper catalog

124 and page description language (PDL) file 402 for print job 103. PDL file 402 may be processed within DFE 106 by RIP firmware 290 to interpret the data of the file and render the data to be printed by print engine 260. During processing of PDL file 402, various parameters may be determined or created for the file, such as dimensions and attributes for print job 103.

As noted above, lists 430 may be displayed within user interface 120. Lists 430 may include papers or groups of papers to present to the operator for printing operations. Lists 430 may be in the form of a menu that includes tabs for the operator to select or obtain further information for each list. For example, lists 430 may include a list for the entire paper catalog 124. The disclosed embodiments, however, enable a multi-tab menu that separates papers into multiple lists or more targeted lists.

One list of lists 430 may display recent papers used at printing device 104 or within printing system 100. Another list may include "favorites" noted by the operator or other operators. The recent and favorite papers may be combined into one list to be displayed at user interface. Further, a list may be provided for papers 114, 116, and 118 loaded into paper trays 108, 110, and 112, respectively, at printing device 104.

Another list may be recommended list 432. Recommended list 432 displays groups or subsets of groups that are recommended for print job 103. Recommended list 432 may be based on several factors, including dimensions 406, a first attribute 408, and a second attribute 410 of print job 103. The disclosed embodiments may use these parameters of print job 103 to refine the plurality of papers within paper catalog 124 to provide recommended list 432 that better shows the available options to the operator.

Parameters for print job 103 may be set forth in print ticket 126 as parameters 128 or determined when processing PDL file 402 within DFE 106. Dimensions 406 may refer to dimensions for one or more sheets of print job 103. If print ticket 126 for print job 103 does not include any instructions related to the desired paper type, then the disclosed embodiments will determine dimensions 406. Paper entries 404 of paper catalog 124 may be searched for papers having dimensions 310 that match dimensions 406. These paper entries may be provided in recommended list 432.

If print job 103 includes dimensions 406 that are a non-standard size, then the disclosed embodiments will perform the following process to provide recommended papers in recommended list 432. Many paper entries 404 within paper catalog 124 may have standard paper size dimensions 310, such as letter, legal, or A4. Further, if printing device 104 is a production printing device, then its paper catalog 124 may have up to 90% of its jobs use three or four standard sizes. Non-standard sizes may not be readily findable in a search of paper catalog 124. Further, the operator would have to manually search paper catalog 124.

Instead of a manual search, the disclosed embodiments determine that dimensions 406 of print job 103 are not available to most of the papers within paper catalog 124. Thus, dimensions 406 may call for a non-standard size. Lists 430 may include paper entries 404 with the non-standard size. The disclosed embodiments also may determine the smallest standard paper size onto dimensions 406 will fit. All papers having that standard paper size will be added to recommended list 432. If the smallest paper size is a custom size, then the disclosed embodiments will include the custom size and the smallest standard paper size that fits dimensions 406 of print job 103.

For example, at least one smallest standard size paper 412 of paper catalog 124 is identified as being able to fit dimensions 406. Using this example, dimensions 406 may be an 8" by 10" sheet. The standard paper sizes for printing device 104 may be letter, or 8.5" by 11", legal, or 8.5" by 14", or A4, or 8.3" by 11.7". The disclosed embodiments may select letter standard size as smallest standard size paper 412. All paper entries within paper catalog 125 having smallest standard size paper 412 are compiled to created first group 414 of papers to be included in recommended list 432. The disclosed embodiments also may select A4 standard size as well, as a separate group to be displayed in recommended list 432.

If paper catalog 124 also includes custom paper sizes that are smaller than smallest standard paper size paper 412, then a paper group in addition to first group 414 may be created. For example, custom size paper 419 may be identified within paper catalog 124. Custom size paper 419 should be smaller than smallest standard size paper 412 but of a size to fit dimensions 406. Using the example above, if dimensions are 8" by 10" then custom size paper 419 may be 8" by 10.5", which fits the dimensions and is smaller than letter sized paper. Paper entries 302 having dimensions 310 of custom size paper 419 are compiled to create third group 421 that may be added to recommended list 432.

In some embodiments, papers having a standard size smaller than dimensions 406 also may be considered. Although these sizes may not necessarily fit dimensions 406, these papers may be of interest to the operator. Thus, the disclosed embodiments may determine largest standard size paper 420 that is smaller than dimensions 406. Using another example, dimensions 406 for print job 103 may be 9" by 12". Largest standard size paper 420 may be letter standard size, or 8.5" by 11". In this example, smallest standard size paper 412 may be 11" by 17". The operator may want to consider paper types 302 having letter standard size for printing. Second group 422 is generated from paper types 302 having largest standard size paper. Second group 422 also is added to recommended list 432.

Print job 103 also may specify other paper attributes aside from dimensions 406, or, in some instances, print ticket 126 may not specify dimensions 406 but may specify paper attributes. The disclosed embodiments may generate subsets of first group 414, second group 422, or third group 421 based on the attributes. First group 414 is disclosed below but the same features apply to any group of papers generated. After first group 414 is created, the disclosed embodiments generate first subset 416 of paper entries 302 in the first group that include first attribute 408. For example, if first group 414 relates to smallest standard paper size 412 of letter standard size, then first subset 416 is limited to those letter standard size papers that match first attribute 408. If first attribute 408 is blue colored paper for print job 103, then first subset 416 includes paper entries 302 having letter standard size for dimensions 310 and blue colored paper. First subset 416 also may be displayed within recommended list 432. It may be displayed in place of first group 414. In other embodiments, first subset 416 may be listed with first group 414.

First subset 416 also may be further limited by second attribute 410 to create second subset 418. Alternatively, second attribute 410 may used to further limit first group 414 to create second subset 418. For example, second attribute 410 may indicate glossy paper for print job 103. In some embodiments, second attribute 410 may be used to further limit first subset 416 so that second subset 418 includes paper entries 302 having smallest standard size paper 412, first attribute 408, and second attribute 410. Second subset 418, therefore, may include papers having letter standard size, blue color, and glossy. Alternatively, if first group 414 is letter standard size papers of paper entries 302, then second subset 418 may be those sized papers that are glossy but does not include first attribute 408. In further embodiments, two second subsets 418 may be created, one with first attribute 408 and the other without it. Second subset 418 also is listed in recommended list 432.

Further print or job attributes may be defined such that recommended list 432 includes recommended papers from paper catalog 124 that specifically address the requirements to print the job. Again, the papers within recommended list 432 may not be specifically specified by print ticket 126 or parameters 128 for print job 103, but compiled from paper catalog 124. The operator may not be aware of better options to complete print job 103. The disclosed embodiments also remove the need to search through paper catalog 124 manually or through long lists of papers that do not meet the needs of the print job.

In some instances, print job 103 may specify a paper tray. In these instances, the dimensions configured for the paper tray should match or be able to process dimensions 406 for print job 103. Thus, the disclosed embodiments may check the paper tray to make sure it can print a paper having dimensions 406 before presenting papers in recommended list 432. For example, if none of the paper trays are not configured to print custom size paper 419, then third group 421 may not be displayed in recommended list 432.

Referring to FIG. 4, first paper tray 108 is shown. Second paper tray 110 and Nth paper tray 112 also may be configured on printing device 104, but not shown due to brevity. First paper tray 108 may include tray dimensions 424 that indicates which sizes of paper are capable of being stored within first paper tray 108. Tray dimensions 424 may vary depending on the current paper, or paper 114, in first paper tray 108. DFE 106, if compiling the groups for recommended list 432, may query first paper tray for tray dimensions 424 to eliminate any groups not suitable based on the tray dimensions.

First paper tray 108 also may include first tray attribute 426 and second tray attribute 428. Tray attributes may pertain to attributes not listed in paper catalog 124 for paper entries 302 but nonetheless impact which papers to use at printing device 104. For example, first tray attribute 426 may be the maximum number of sheets that can be stored within first paper tray 108. Second tray attribute 428 may be number of sheets currently within first paper tray 108.

If tray dimensions 424 do not match dimensions 406 for print job 103, then the disclosed embodiments may send a warning 440 to user interface 120 for the operator. Warning 440 may be provided in recommended list 432 along with the group of paper entries having the dimensions not currently supported by the paper tray. Preferably, the list of papers in recommended list 432 does not change based on the specified tray. Warning 440 is intended to let the operator know that first paper tray 108 cannot support dimensions 406. The operator may take action to configure first paper tray 108 to enable the use of dimensions 406.

At any time during the generating of recommended list 432, the different features to select standard size papers for non-standard dimensions may be enabled or disabled by the operator. In other words, the operator may not desire to generate second group 422 for the largest standard size paper 420 that is smaller than dimensions 406. The operator may not want to have the print job on a smaller paper than needed. The operator also may configure how many attributes are considered in generating subsets as well.

Figure 5:
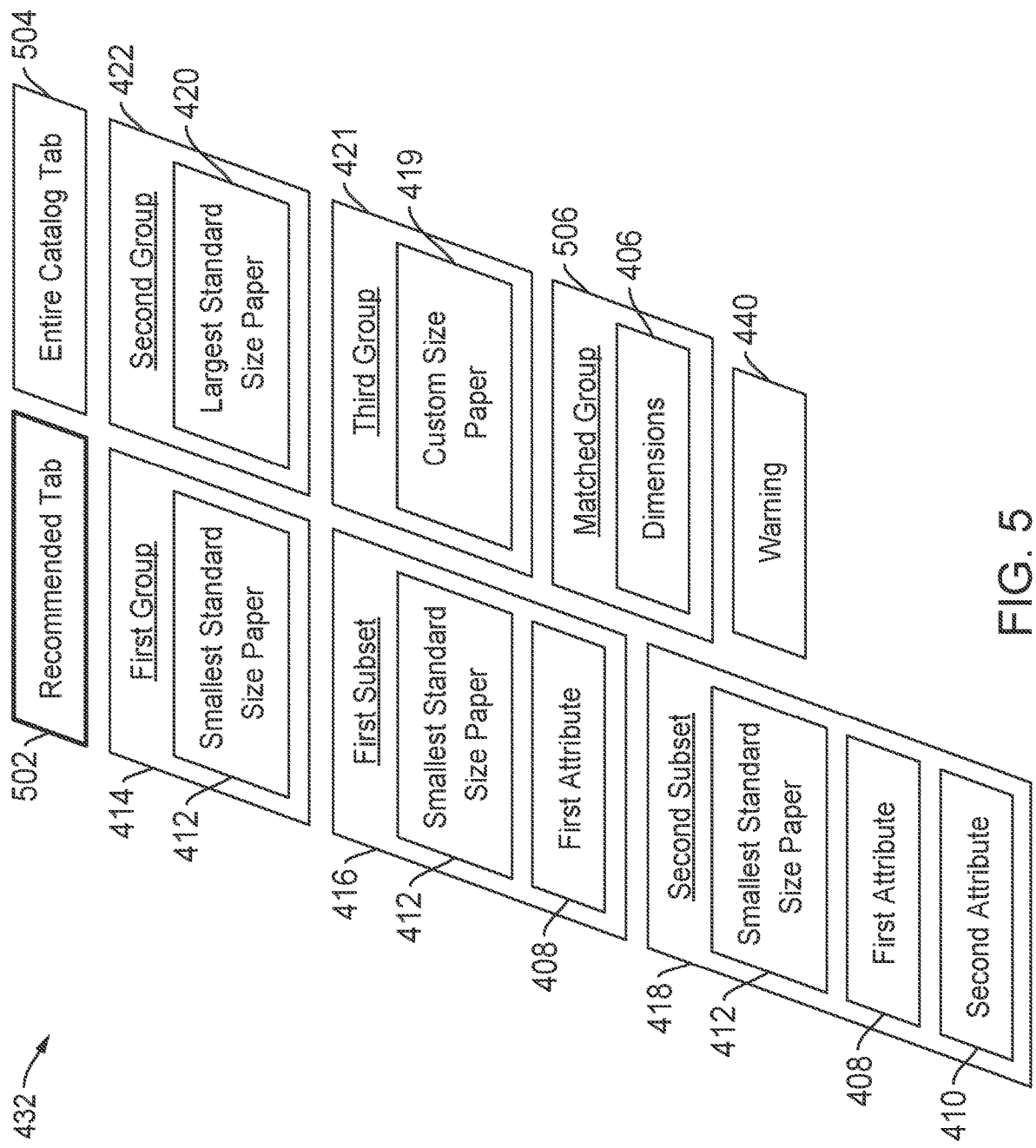
FIG. 5 illustrates a block diagram of a recommended list showing the groups of paper entries along with parameters as displayed within the user interface according to the disclosed embodiments.

FIG. 5 depicts a block diagram of recommended list 432 showing the groups of paper entries along with parameters as displayed within user interface 120 according to the disclosed embodiments. FIG. 5 may show what an example recommended list 432 would look like as it is displayed within user interface 120. This example is based on the features disclosed in FIG. 4.

Recommended list 432 includes recommended tab 502 and entire catalog tab 504. The operator may toggle between recommended list 432 that is generated according to the disclosed embodiments or the entire paper catalog 124. When recommended tab 502 is selected, recommended list 432 is displayed. The information displayed may pertain to groups of papers that are selected according to parameters 128 of print job 103.

First group 414 may be listed for papers corresponding to smallest standard size paper 412, as disclosed above. First group 414 may highlight the smallest standard size paper that is acceptable for dimensions 406 of print job 103 if the dimensions do not match a standard size available at printing device 104. As disclosed above, printing device 104 may use 3-4 standard paper sizes that make up the majority of paper entries 302 for paper catalog 124. Sometimes, however, a non-standard size may be specified for a print job. The disclosed embodiments recommend papers based on standard sizes available at printing device 104.

Recommended list 432 also may include first subset 416 as another group of papers to be selected for print job 103. First subset 416 may be a subset of first group 414 that includes smallest standard size paper 414 along with papers having first attribute 408. First attribute 408 is highlighted within user interface 120 to emphasize the first attribute as being part of first subset 416. Second subset 418 also may be displayed. In some embodiments, second subset 418 may further refine first subset 416. Thus, second subset 418 includes papers having smallest standard size paper 412, first attribute 408, and second attribute 410. First attribute 408 and second attribute 410 may be highlighted. In some embodiments, second subset 418 may include papers having smallest standard size paper 412 and second attribute 410.

Second group 422 of papers also may be displayed within recommended list 432. Second group 422 includes papers having largest standard size paper 420 smaller than dimensions 406, but available at printing device 104. Thus, recommended list 432 shows second group 422 and highlights the largest standard size of the papers within the second group. Third group 421 of papers also may be displayed. As disclosed above, third group 421 includes papers having custom size paper 419 that is available to printing dimensions 406. In some embodiments, first paper tray 108 may not be configured to print custom size paper 419 so warning 440 is displayed within recommended list 432.

Recommended list 432 also may display matched group 506 of papers that include dimensions 310 that exactly match dimensions 406 for print job 103. Thus, matched group 506 highlights dimensions 406 to indicate to the operator that papers within paper catalog 124 are available to print the specified dimensions. These papers, however, may not be desirable to complete the print job so that the other paper groups displayed within recommended list 432 are desirable to review.

Recommended list 432 may be searchable. Papers shown in recommended list 432 also highlight the attributes and dimensions pertaining to print job 103. In some instances, paper groups may be generated based on tray attributes as well. For example, first tray attribute 426 may indicate a maximum number of sheets that can be stored in first paper tray 108. A paper group within recommended list 432 may include the dimensions of the sheet of paper plus whether paper tray 108 can finish the job without reloading.

Figure 6:
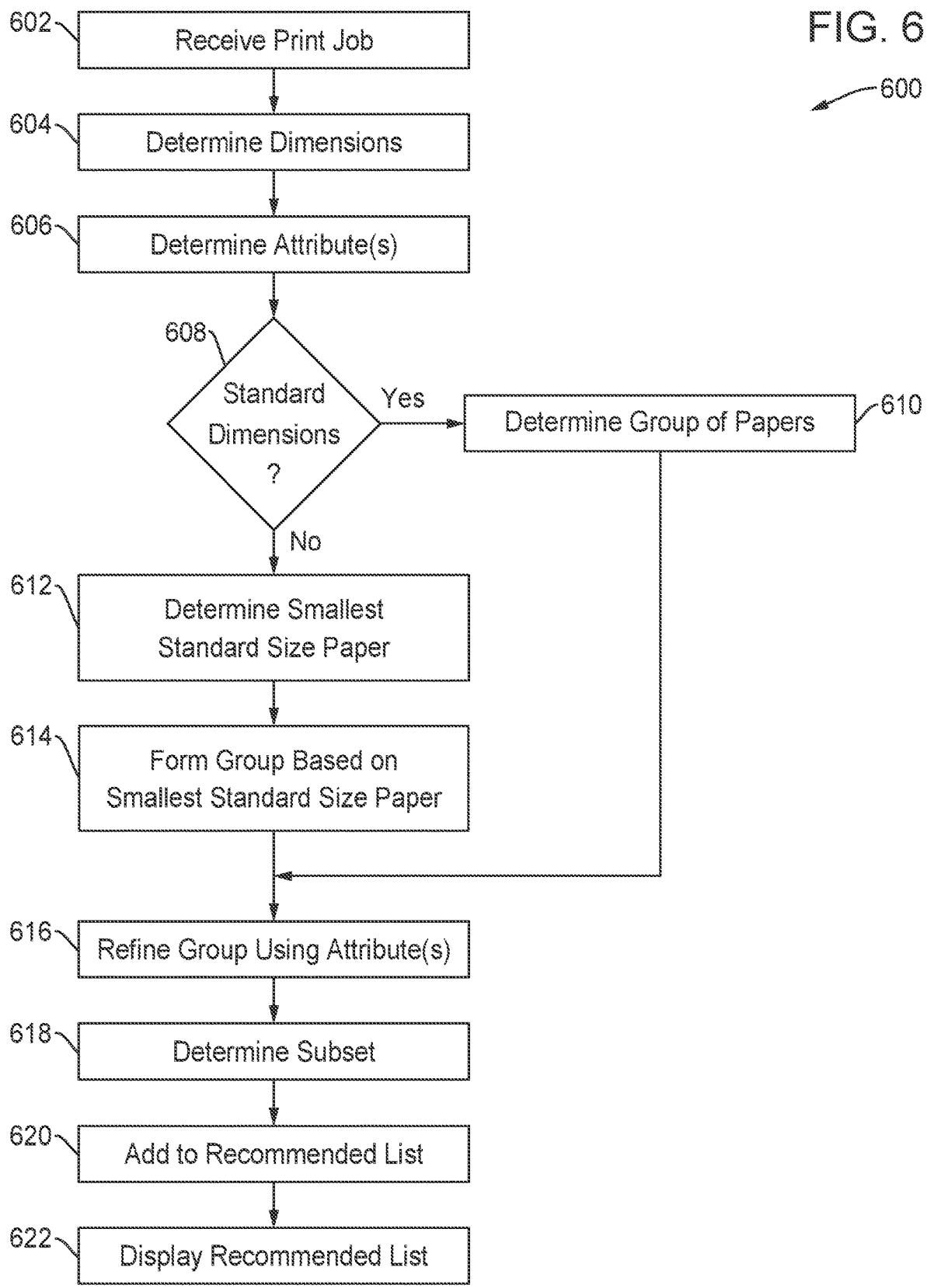
FIG. 6 illustrates a flowchart for selecting a paper group or paper for a print job using a recommended list according to the disclosed embodiments.

FIG. 6 depicts a flowchart 600 for selecting a paper group or paper for a print job 103 using a recommended list 432 according to the disclosed embodiments. Flowchart 600 may refer to FIGS. 1A-5 for illustrative purposes. Flowchart 600, however, is not limited to the embodiments disclosed in FIGS. 1A-5.

Step 602 executes by receiving print job 103 within printing system 100, or at printing device 104. Print job 103 also may be received by DFE 106 for processing. When received within printing system 100, the disclosed embodiments may generate recommended list 432 for paper to be used for print job 103. Alternatively, print job 103 may be received at a program at client device 102 for scheduling print jobs.

Step 604 executes by determining dimensions 406 for print job 103. As disclosed above, dimensions 406 may be included with print ticket 126. Alternatively, dimensions 406 may be determined when processing print job within DFE 106 using PDF file 402. Step 606 executes by determining one or more attributes for print job 103, such as first attribute 408 or second attribute 410. Examples of attributes may be provided above. The dimensions and attributes for print job 103 may be known as parameters, shown as parameters 128 with print ticket 126. Parameters 128 also may be derived when processing print job 103 within DFE 106.

Step 608 executes by determining whether dimensions 406 of print job 103 are standard for papers loaded at printing device 104 or within paper catalog 124 of printing device 104. The definition of standard may vary, depending on the printing device, but is usually 3-4 papers commonly used in printing operations at the printing device. Examples may be letter sized papers, legal sized papers, or postcard sized paper media. Printing device 104 may use other sizes more commonly. The operator may define which papers are standard within paper catalog 124.

If step 608 is yes, then step 610 executes by determining a group of paper entries 302 within paper catalog that match dimensions 406. The paper entries should be standard sized papers. In addition to favorites and recently used papers, this group will provide the operator with further options for printing operations. This group, however, may be quite large and unwieldy to review, especially if it includes 100s of paper entries 302. Further refinement may be needed. Flowchart 600 proceeds to step 616, disclosed in greater detail below.

If step 608 is no, then step 612 executes by determining a smallest standard size paper 412 that fits dimensions 406. Print job 103, based on dimensions 406, calls for a non-standard sized paper. The disclosed embodiments may generate matched group 506 for recommended list 432 having dimensions 406 from paper entries 302 in paper catalog 124. The operator, however, may desire more options, especially if non-standard sized paper is an extra cost. Thus, the smallest standard sized paper that fits dimensions 406 is identified.

Step 614 executes by forming a group based on smallest standard size paper 412. For example, first group 414 may be determined from paper entries 302 in paper catalog 124 that match the standard size paper. In some embodiments, first group 414 may include 100s of paper entries 302. Thus, step 616 executes by refining the group using one or more attributes for print job 103. Any group may be refined using the attributes to reduce the number of paper entries 302 for recommendation. For example, first attribute 408 may be used to identify paper entries 302 having smallest standard size paper 412 and first attribute 408 within paper catalog 124.

Step 618 executes by determining a subset of first group 414 or the group of standard size papers determined in step 610 that includes one or more attributes of print job 103. More than one subset of the groups may be determined. Once all the groups and subsets are determined, then step 620 executes by adding them to recommended list 432. Recommended list 432 is generated in addition to lists for recent or favorite papers plus the entire paper catalog 124.

Step 622 executes by displaying recommended list 432 along with paper catalog 124 or the other lists within user interface 120. User interface 120 may be located at printing device 104 or even accessible by DFE 106. Alternatively, user interface 120 may be located at another device within printing system 100, such as client device 102. The operator may interact with recommended list 432 by selecting the listed groups and subsets from a menu. The operator also may search recommended list 432.

Recommended list 432 provides options to the operator to complete print job 103 without the need to search or scroll through the entire paper catalog 124. Further, it is automatically generated so that the operator does not need to have special training or understanding of paper catalog 124. Print shops make money by keeping printing devices operating as much as possible. Thus, the disclosed processes help keep printing devices operating at capacity without a long delay for selecting papers, especially for non-standard paper sizes.

For example, print job 103 may be for postcards to include color printed graphics and having dimensions 406. The postcards also may be printed on glossy paper media. The order for print job 103 may be received over a website as opposed directly to a printing device. The user may have choices for good, better, and best paper media for the postcards, also known as print conditions. A good print condition may be paper media having 90 gsm, better may be 100 gsm, and best may be 110 gsm.

The user does not know which paper to specify or even which papers are available. Papers available for print jobs also may change over time. Thus, the disclosed embodiments determine dimensions 406 for the postcards along with a first attribute of the specified print condition, or weight, of the desired paper media and a second attribute of glossy. Dimensions 406 may indicate a non-standard size for the paper media of the postcards. Thus, the disclosed embodiments may generate a group for the exact dimensions of the postcards along with a group having the small standard size post cards that fits dimensions 406 and provides more options for printing.

Using the above examples, the group of the exact dimensions may only have 5 paper entries within the paper catalog. By generating a group of the smallest standard size postcards to fit the dimensions, the number of recommended paper entries may increase by quite a bit. Further, the larger number of entries means that it is more likely a paper entry is available to meets are the attributes specified for the print job. For example, the print job for the post cards may include 20 different paper attributes. A larger pool of paper entries will result in more options for the operator to select.

Further, the groups may be refined by the paper attributes to show more targeted subsets of groups to select. Further, paper trays may be queried to determine whether the paper trays can support the different sized paper medias and attributes. If not, then a warning may be displayed to the user. The papers still may be selected for the print job but the operator may need to take further action such as configuring the paper tray or loading the correct paper media for the postcards.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for selecting a paper media for printing operations, the method comprising:
    receiving a print job for a printing device, wherein a sheet of the print job includes dimensions;
    accessing a plurality of papers in a paper catalog available for the printing device, wherein the paper catalog includes an entry for each of the plurality of papers, the entry having dimensions, at least one attribute, and a print condition;
    determining that a paper within the plurality of papers in the paper catalog is not available to print the print job based on the dimensions of the sheet;
    determining at least one paper having a smallest standard size within the plurality of papers to fit the dimensions of the sheet;
    forming a first group of the at least one paper corresponding to the smallest standard size; and
    displaying the first group having the at least one paper having the smallest standard size as available to print the print job.

2. The method of claim 1, further comprising searching the paper catalog available for the printing device for at least one paper applicable for the print job according to the dimensions.

3. The method of claim 1, further comprising
    determining at least one paper having a largest standard size within the plurality of papers that do not fit the dimensions of the sheet;
    forming a second group of the at least one paper corresponding to the largest standard size; and
    displaying the second group having the at least one paper having the largest standard size as available to print the print job.

4. The method of claim 1, further comprising checking a paper tray of the printing device to determine whether a paper tray configuration matches the dimensions of the sheet.

5. The method of claim 1, further comprising checking a paper tray of the printing device to determine whether a paper tray configuration matches the smallest standard size.

6. The method of claim 4, further comprising displaying a warning with the first group of the at least one paper corresponding to the smallest standard size.

7. The method of claim 1, wherein the dimension of the sheet are page description language (PDL) dimensions.

8. The method of claim 1, further comprising identifying an attribute for the print job apart from the dimensions for the sheet;
    determining the attribute corresponds to the at least one attribute in the entry for a subset of the first group; and
    forming the subset of the first group based on the attribute.

9. The method of claim 8, further comprising
    displaying the subset of the first group having the attribute.

* * * * *